(12) United States Patent
Pollett

(10) Patent No.: US 9,677,214 B2
(45) Date of Patent: Jun. 13, 2017

(54) FLUID ADDITIVE DISPENSER FOR A WASHING MACHINE APPLIANCE

(71) Applicant: General Electric Company, Schenectady, NY (US)

(72) Inventor: James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 254 days.

(21) Appl. No.: 14/591,021

(22) Filed: Jan. 7, 2015

(65) Prior Publication Data

US 2016/0194812 A1    Jul. 7, 2016

(51) Int. Cl.
| | |
|---|---|
| *D06F 39/02* | (2006.01) |
| *B29C 67/00* | (2017.01) |
| *B01F 3/08* | (2006.01) |
| *B01F 5/00* | (2006.01) |
| *B01F 15/00* | (2006.01) |
| *B33Y 80/00* | (2015.01) |
| *B33Y 50/02* | (2015.01) |
| *B29L 31/00* | (2006.01) |
| *B33Y 10/00* | (2015.01) |

(52) U.S. Cl.
CPC .......... *D06F 39/022* (2013.01); *B01F 3/0865* (2013.01); *B01F 5/0057* (2013.01); *B01F 15/00876* (2013.01); *B29C 67/0051* (2013.01); *B29C 67/0088* (2013.01); *B29L 2031/762* (2013.01); *B33Y 10/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| | | |
|---|---|---|
| 7,312,269 B2 | 12/2007 | Cevolini |
| 8,286,236 B2 | 10/2012 | Jung et al. |

FOREIGN PATENT DOCUMENTS

| | | | |
|---|---|---|---|
| CN | 103287191 A | | 9/2013 |
| FR | 2588292 | * | 10/1985 |
| GB | 1134483 | * | 1/1967 |

OTHER PUBLICATIONS

English machine translation of FR2588292.*

* cited by examiner

*Primary Examiner* — Michael Kornakov
*Assistant Examiner* — Jason Riggleman
(74) *Attorney, Agent, or Firm* — Dority & Manning, P.A.

(57) ABSTRACT

A unitary fluid additive dispenser includes a mixing bowl, an inlet conduit and a plurality of nozzles. The inlet conduit and the plurality of nozzles are mounted to the mixing bowl. Each nozzle of the plurality of nozzles is in fluid communication with the inlet conduit and is positioned and oriented for directing a flow of fluid from the inlet conduit into a mixing chamber of the mixing bowl. A related method for forming a unitary fluid additive dispenser is also provided.

8 Claims, 5 Drawing Sheets

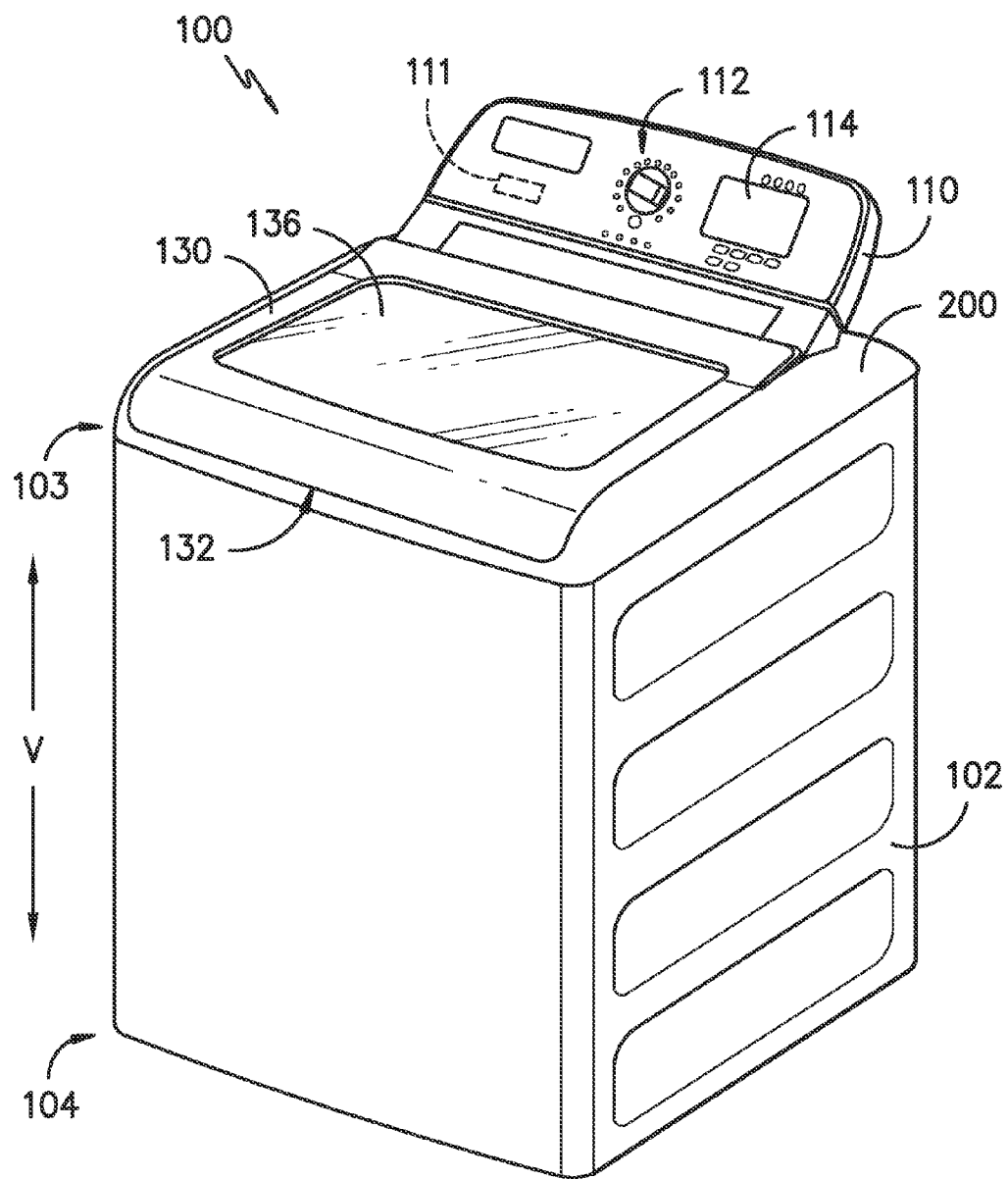
FIG. -1-

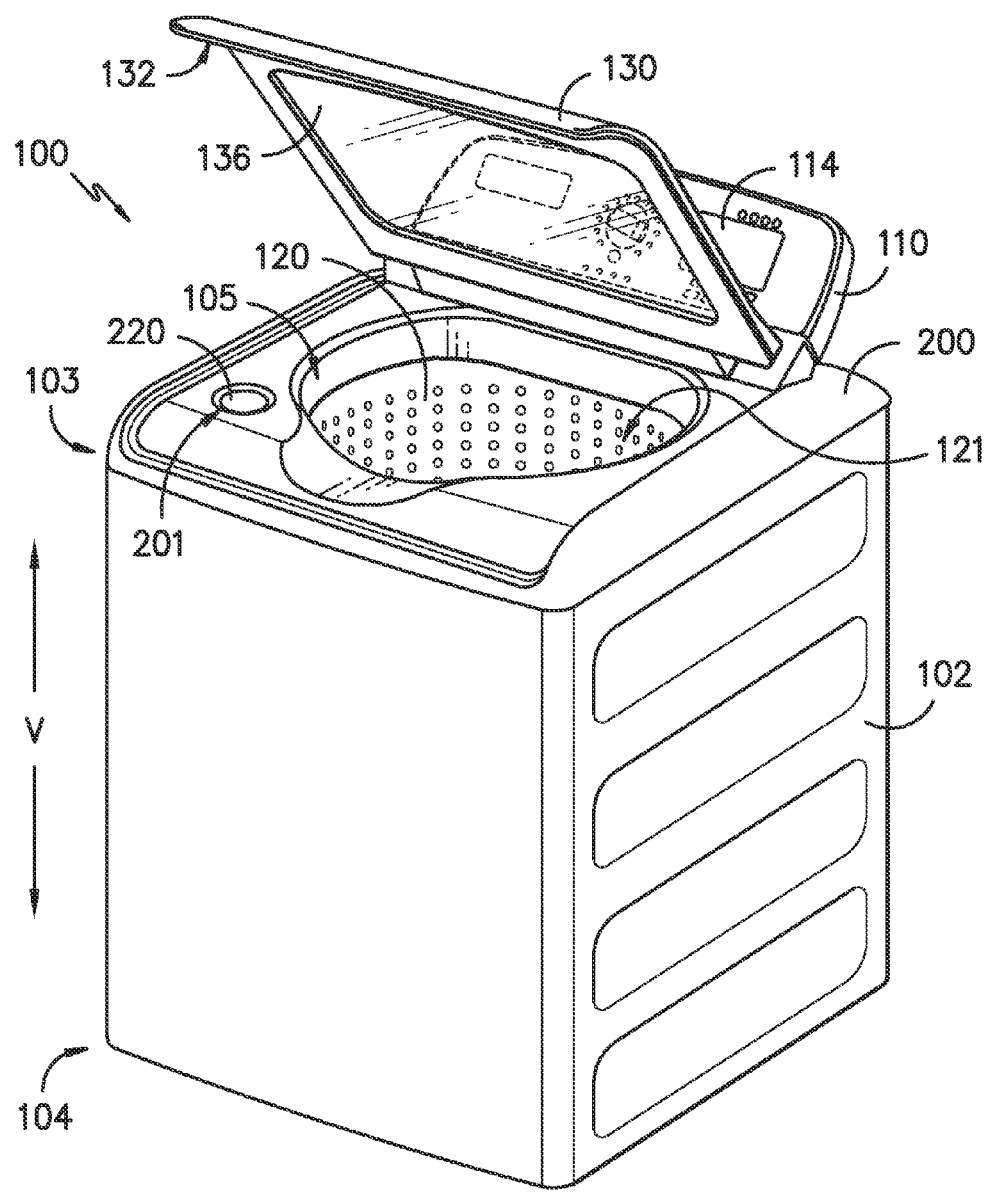
FIG. -2-

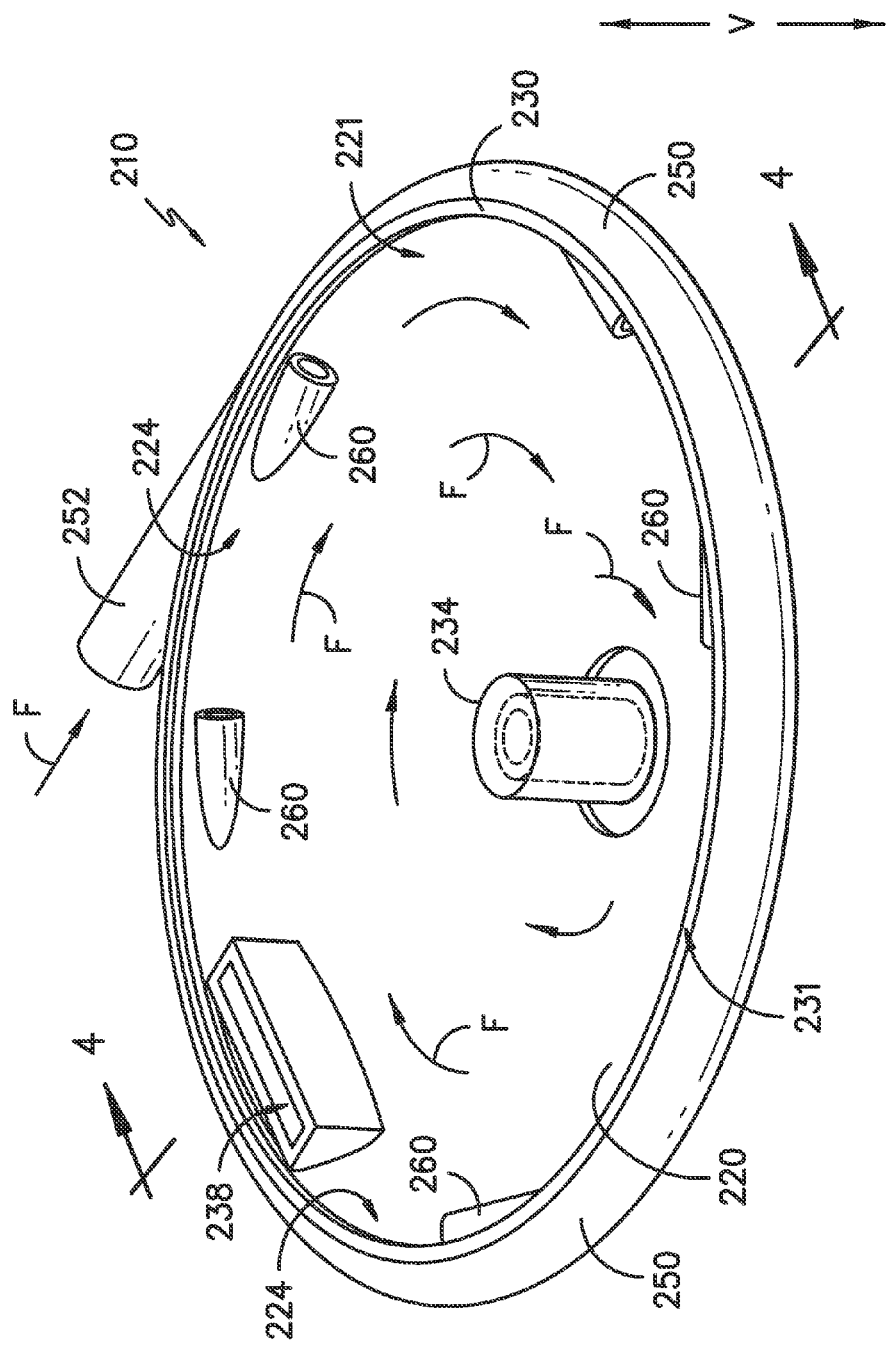
FIG. -3-

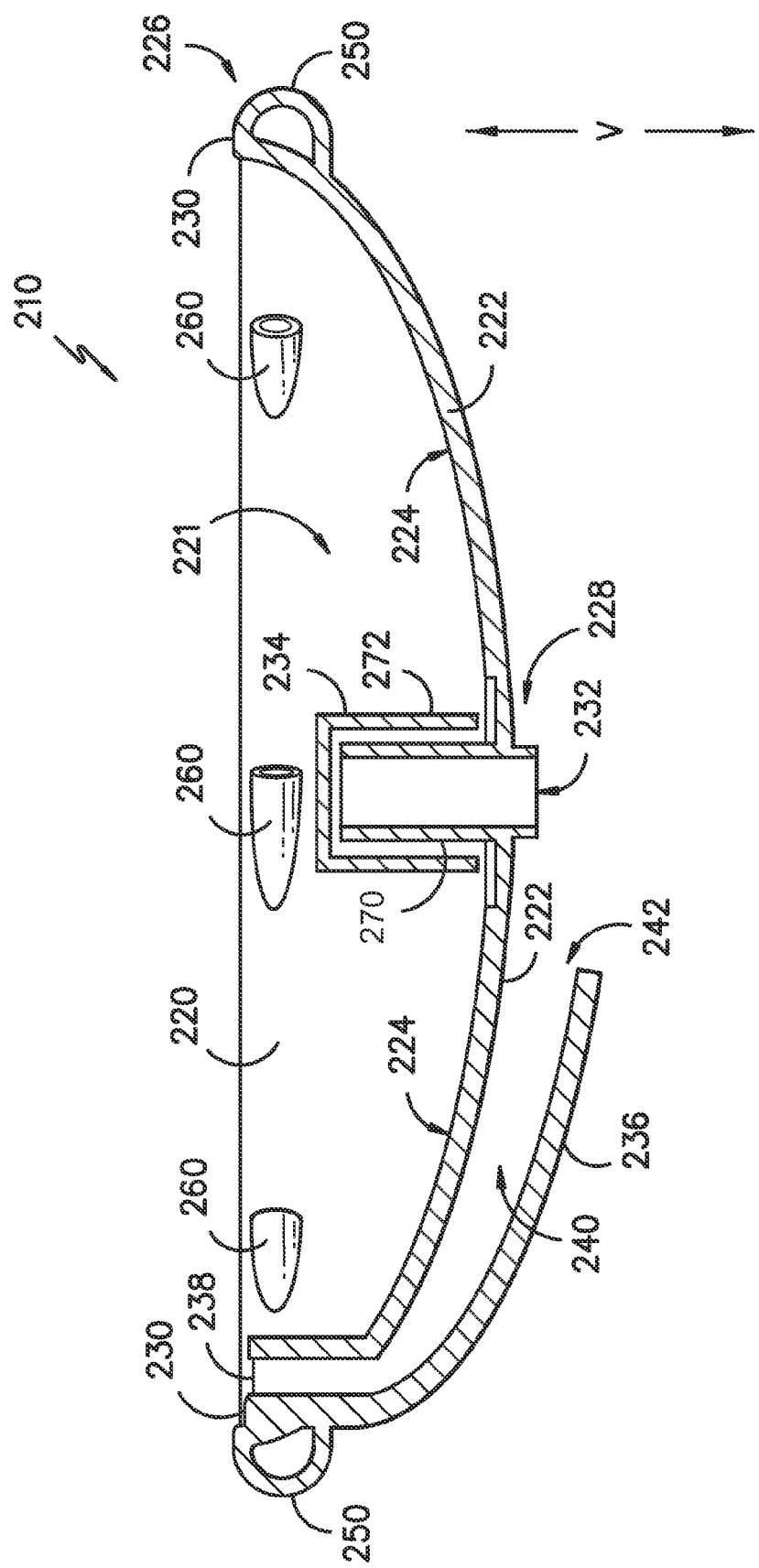
FIG. -4-

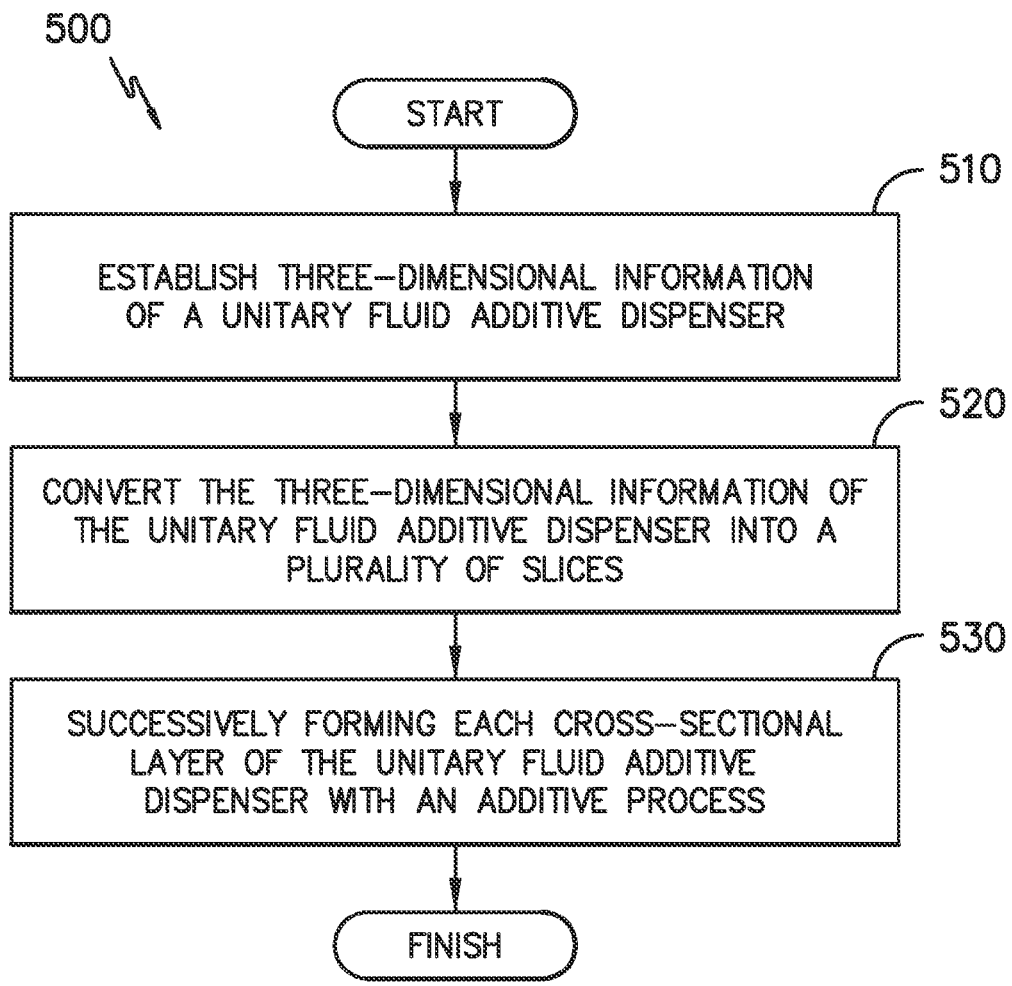
FIG. -5-

(12) United States Patent

FLUID ADDITIVE DISPENSER FOR A WASHING MACHINE APPLIANCE

FIELD OF THE INVENTION

The present subject matter relates generally to fluid additive dispensers for appliances, such as washing machine appliances.

BACKGROUND OF THE INVENTION

Washing machine appliances generally include a tub with a drum rotatably mounted therein. The tub defines a wash chamber for receipt of articles for washing. During operation of such washing machine appliances, a wash liquid is directed into the tub and onto articles within the wash chamber of the drum. The drum can rotate at various speeds to agitate articles within the wash chamber in the wash fluid, wring wash fluid from articles within the wash chamber, etc.

During operation of certain washing machine appliances, a volume of wash liquid is directed into the tub in order to wash and/or rinse articles within the wash chamber of the drum. One or more fluid additives may be added to the wash liquid to enhance the cleaning or other properties of the wash liquid. The fluid additives may be in powder or concentrated liquid form, and are generally added to a dispenser cup of the washing machine appliance by, e.g., a user of the washing machine appliance. A portion of the wash liquid to be added to the tub may be directed into the dispenser cup to transport the fluid additive to the tub. However, such wash liquid is generally provided as a concentrated flow from an inlet in one area of the dispenser cup, and thus does not reach all of the fluid additive(s) in the dispenser cup. Further, such flows may cause unwanted turbulence in the dispenser cup, causing certain wash materials, e.g., wash detergent, to foam up and leave unwanted residue in the dispenser cup. Thus, residue of the fluid additive(s) may remain within the container.

Accordingly, a dispenser cup that can direct a flow of water or other wash liquid to more fully cover an area of the dispenser cup and reduce an amount of fluid additive residue in the dispenser cup would be useful.

BRIEF DESCRIPTION OF THE INVENTION

The present subject matter provides a unitary fluid additive dispenser. The unitary fluid additive dispenser includes a mixing bowl, an inlet conduit and a plurality of nozzles. The inlet conduit and the plurality of nozzles are mounted to the mixing bowl. Each nozzle of the plurality of nozzles is in fluid communication with the inlet conduit and is positioned and oriented for directing a flow of fluid from the inlet conduit into a mixing chamber of the mixing bowl. A related method for forming a unitary fluid additive dispenser is also provided. Additional aspects and advantages of the invention will be set forth in part in the following description, or may be apparent from the description, or may be learned through practice of the invention.

In a first exemplary embodiment, a washing machine appliance is provided. The washing machine appliance includes a cabinet. A tub is positioned within the cabinet. A basket is disposed within the tub. The basket is rotatable about an axis within the tub. A unitary fluid additive dispenser is positioned within the cabinet. The unitary fluid additive dispenser includes a mixing bowl that defines a mixing chamber. An inlet conduit is mounted to the mixing bowl. A plurality of nozzles is also mounted to the mixing bowl. Each nozzle of the plurality of nozzles is in fluid communication with the inlet conduit. Each nozzle of the plurality of nozzles is positioned and oriented for directing a flow of fluid from the inlet conduit into the mixing chamber of the mixing bowl.

In a second exemplary embodiment, a unitary fluid additive dispenser is provided. The unitary fluid additive dispenser includes a mixing bowl that defines a mixing chamber. The mixing bowl extends between a top portion and a bottom portion. An inlet conduit is mounted to the mixing bowl at the top portion of the mixing bowl. A plurality of nozzles is also mounted to the mixing bowl. Each nozzle of the plurality of nozzles is in fluid communication with the inlet conduit. Each nozzle of the plurality of nozzles is positioned and oriented for directing a flow of fluid from the inlet conduit into the mixing chamber of the mixing bowl. The mixing bowl, the inlet conduit and the plurality of nozzles are constructed of a single continuous piece of material.

In a third exemplary embodiment, a method for forming a unitary fluid additive dispenser for a washing machine appliance is provided. The method includes establishing three-dimensional information of the unitary fluid additive dispenser, converting the three-dimensional information of the unitary fluid additive dispenser from said step of establishing into a plurality of slices with each slice of the plurality of slices defining a respective cross-sectional layer of the unitary fluid additive dispenser, and successively forming each cross-sectional layer of the unitary fluid additive dispenser with an additive process. After the step of successively forming: (1) the unitary fluid additive dispenser has a mixing bowl, an inlet conduit, and a plurality of nozzles; (2) the mixing bowl defines a mixing chamber; (3) each nozzle of the plurality of nozzles is in fluid communication with the inlet conduit; and (4) each nozzle of the plurality of nozzles is positioned and oriented for directing a flow of fluid from the inlet conduit into the mixing chamber of the mixing bowl.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance according to an exemplary embodiment of the present subject matter with a door of the exemplary washing machine appliance shown in a closed position.

FIG. 2 provides a perspective view of the exemplary washing machine appliance of FIG. 1 with the door shown in an open position.

FIG. 3 provides a perspective view of a unitary fluid additive dispenser of the exemplary washing machine appliance of FIG. 1.

FIG. 4 provides a section view of the unitary fluid additive dispenser of FIG. 3 taken along the 4-4 line of FIG. 3.

FIG. 5 illustrates a method for forming a unitary fluid additive dispenser according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 illustrate an exemplary embodiment of a vertical axis washing machine appliance 100. In FIG. 1, a lid or door 130 is shown in a closed position. In FIG. 2, door 130 is shown in an open position. While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machines.

Washing machine appliance 100 has a cabinet 102 that extends between a top 103 and a bottom 104 along a vertical direction V. A wash basket 120 is rotatably mounted within cabinet 102, e.g., within a tub (not shown) positioned within cabinet 102. A motor (not shown) is in mechanical communication with wash basket 120 in order to selectively rotate wash basket 120 within the tub, e.g., during an agitation or a rinse cycle of washing machine appliance 100. Wash basket 120 defines a wash chamber 121 that is configured for receipt of articles for washing. An agitator or impeller (not shown) extends from wash basket 120 into wash chamber 121. The impeller assists agitation of articles disposed within wash chamber 121 during operation of washing machine appliance 100, as will be understood by those skilled in the art.

Cabinet 102 of washing machine appliance 100 has a top panel 200. Top panel 200 defines an opening 105 that permits user access to wash chamber 121 of wash basket 120. Door 130 is rotatably mounted to top panel 200. However, alternatively, door 130 may be mounted to cabinet 102 or any outer suitable support. Door 130 selectively rotates between the closed position shown in FIG. 1 and the open position shown in FIG. 2. In the closed position, door 130 inhibits access to wash chamber 121. Conversely, in the open position, a user can access wash chamber 121. A window 136 in door 130 permits viewing of wash chamber 121 when door 130 is in the closed position, e.g., during operation of washing machine appliance 100. Door 130 also includes a handle 132 that, e.g., a user may pull and/or lift when opening and closing door 130.

Top panel 200 defines a hole 201. Hole 201 is configured for receipt of a plurality of fluid additives, e.g., detergent, fabric softener, and/or bleach. Hole 201 permits the fluid additives to pass through top panel 200 to a fluid additive dispenser 210 disposed below top panel 200 along the vertical direction V. Thus, a user may pour the fluid additives in to fluid additive dispenser 210 through hole 201 in top panel 200. Fluid additive dispenser 210 is described in greater detail below.

A control panel 110 with a plurality of input selectors 112 extends from top panel 200. Control panel 110 and input selectors 112 collectively form a user interface input for operator selection of machine cycles and features. A display 114 of control panel 130 indicates selected features, a countdown timer, and/or other items of interest to appliance users.

Operation of washing machine appliance 100 is controlled by a controller or processing device (not shown) that is operatively coupled to control panel 110 for user manipulation to select washing machine cycles and features. In response to user manipulation of control panel 110, the controller operates the various components of washing machine appliance 100 to execute selected machine cycles and features.

In an illustrative embodiment, laundry items are loaded into wash chamber 121 through opening 105, and washing operation is initiated through operator manipulation of input selectors 112. Wash basket 120 and/or the wash tub within cabinet 102 is filled with water and detergent to form a wash fluid. One or more valves (not shown) can be controlled by washing machine appliance 100 to provide for filling wash basket 120 to the appropriate level for the amount of articles being washed. Once wash basket 120 is properly filled with fluid, the contents of wash chamber 121 are agitated, e.g., with the impeller within wash basket 120, for cleansing of laundry items in wash basket 120.

After the agitation phase of the wash cycle is completed, wash basket 120 is drained. Laundry articles can then be rinsed by again adding fluid to wash basket 120, depending on the particulars of the cleaning cycle selected by a user, the impeller may again provide agitation within wash chamber 121. One or more spin cycles may also be used. In particular, a spin cycle may be applied after the wash cycle and/or after the rinse cycle in order to wring wash fluid from the articles being washed. During a spin cycle, wash basket 120 is rotated at relatively high speeds. After articles disposed in wash basket 120 are cleaned and/or washed, the user can remove the articles from wash basket 120, e.g., by reaching into wash chamber 121 through opening 105.

As discussed above, wash basket 120 is rotatably mounted within the wash tub in cabinet 102. Wash basket 120 may be spaced apart from the wash tub, e.g., by a radial gap, in order to permit rotation of wash basket 120 within the wash tub. The wash tub is configured for containing wash and rinse fluids during operation of washing machine appliance 100 described above. Wash and rinse fluids disposed within the wash tub can be used to clean articles disposed in wash basket 120. Wash and rinse fluids can pass between wash basket 120 and the wash tub through a plurality of apertures defined by wash basket 120, e.g., during the wash and/or spin cycles described above.

As discussed above, fluid additive dispenser 210 is mounted above the wash tub and wash basket 120, e.g., along the vertical direction V. More particularly, fluid additive dispenser 210 may be mounted above the radial gap between the wash tub and wash basket 120. Fluid additive dispenser 210 is configured for receipt of fluid additives from hole 201. Fluid additive dispenser 210 is also configured for directing the fluid additives into the radial gap between the wash tub and wash basket 120. For example, fluid additive dispenser 210 may direct detergent into the radial gap between the wash tub and wash basket 120 prior to a wash cycle of washing machine appliance 100. Similarly, fluid additive dispenser 210 may direct fabric softener into the radial gap between the wash tub and wash basket 120 prior to a rinse cycle of washing machine appliance 100.

FIG. 3 provides a perspective view of fluid additive dispenser 210 of washing machine appliance 100. FIG. 4 provides a section view of fluid additive dispenser 210 taken along the 4-4 line of FIG. 3. As may be seen in FIGS. 3 and 4, fluid additive dispenser 210 includes a mixing bowl 220 that defines a mixing chamber 221. Mixing bowl 220 extends between a top portion 226 and a bottom portion 228, e.g., along the vertical direction V. Mixing bowl 220 defines an inlet 231 at or adjacent top portion 226 of mixing bowl 220. Inlet 231 may be positioned directly below hole 201 of top panel 200 (FIG. 2) in order to receive a fluid additive. From inlet 231, the fluid additive may flow into mixing chamber 221. Mixing bowl 220 also defines a top edge 230, e.g., at or adjacent top portion 226 of mixing bowl 220.

Mixing bowl 220 further defines an outlet 232 at or adjacent bottom portion 228 of mixing bowl 220 and/or a central portion of mixing chamber 221. Mixing bowl 220 also includes a bottom wall 222 that defines a sloped surface 224. Sloped surface 224 assists with defining mixing chamber 221 and may extend between top portion 226 and bottom portion 228 of mixing bowl 220, e.g., along the vertical direction V. In particular, sloped surface 224 may extend from top portion 226 of mixing bowl 220 towards outlet 232 at bottom portion 228 of mixing bowl 220. Thus, fluid additive within mixing chamber 221 may flow down sloped surface 224 towards outlet 232 of mixing bowl 220. Bottom wall 222 may extend about outlet 232 of mixing bowl 220. Thus, bottom wall 222 may have a circular shape e.g., in a plane that is perpendicular to the vertical direction V.

Fluid additive dispenser 210 also includes an inlet conduit 250 mounted to or integrally formed with mixing bowl 220. Inlet conduit 250 may be mounted to mixing bowl 220 at or adjacent top portion 226 of mixing bowl 220. In particular, inlet conduit 250 may be mounted to mixing bowl 220 at top edge 230 of mixing bowl 220. Inlet conduit 250 may also extend about or around mixing bowl 220 at top portion 226 of mixing bowl 220. Thus, inlet conduit 250 may have a generally circular shape, e.g., in a plane that is perpendicular to the vertical direction V. Inlet conduit 250 is configured for receiving a flow of liquid, such as water. Thus, a hose, pipe or other conduit may be mounted or secured to a coupling 252 of inlet conduit 250 in order to permit liquid from the hose, pipe or other conduit to flow into the inlet conduit 250 at coupling 252.

Fluid additive dispenser 210 further includes a plurality of nozzles 260 mounted to or integrally formed with mixing bowl 220. Each nozzle of nozzles 260 is in fluid communication with inlet conduit 250. Thus, inlet conduit 250 extends to each nozzle of nozzles 260, and liquid from inlet conduit 250 may flow into each nozzle of nozzles 260. Each nozzle of nozzles 260 is also positioned and oriented for directing a flow of fluid (shown with arrows F) from inlet conduit 250 into mixing chamber 221 of mixing bowl 220. Nozzles 260 may be positioned within mixing chamber 221 at or adjacent top portion 226 of mixing bowl 220. In addition, nozzles 260 may be positioned at top edge 230 of mixing bowl 220.

Nozzles 260 may be circumferentially distributed about mixing chamber 221 at top portion 226 of mixing bowl 220. In particular, nozzles 260 may be uniformly distributed about mixing chamber 221 on top edge 230 of mixing bowl 220. Thus, each nozzle of nozzles 260 may be oriented along a common flow direction (e.g., that is perpendicular to the vertical direction V) in order to form a swirl flow pattern with the flow of fluid F from each nozzle of nozzles 260 within mixing chamber 221 of mixing bowl 220. The swirl pattern of fluid from nozzles 260 may assist with rinsing sloped surface 224 of bottom wall 222 during operation of washing machine appliance 100. In particular, the flow of fluid F from each nozzle of nozzles 260 within mixing chamber 221 of mixing bowl 220 may assist with removing fluid additive from sloped surface 224 of bottom wall 222.

Nozzles 260 may include any suitable number of nozzles 260. For example, nozzles 260 may include at least two nozzles, at least three nozzles, at least four nozzles, at least six nozzles, at least eight nozzles, etc. It should be understood that in certain exemplary embodiments, fluid additive dispenser 210 may include only a single nozzle.

As may be seen in FIGS. 3 and 4, fluid additive dispenser 210 may also include a siphon valve 234 and an overflow conduit 236. Siphon valve 234 is mounted to mixing bowl 220 at outlet 232 of mixing bowl 220. Siphon valve 234 may operate to release wash fluid from mixing chamber 221 of mixing bowl 220. In particular, when liquid fills mixing chamber 221 of mixing bowl 220 to a threshold height, siphon valve 234 may draw liquid out of mixing chamber 221 of mixing bowl 220 to outlet 232 of mixing bowl 220. Thus, the flow of fluid F from each nozzle of nozzles 260 may mix with fluid additive within mixing chamber 221 of mixing bowl 220 in order to form a wash fluid. When the wash fluid fills mixing chamber 221 of mixing bowl 220 to the threshold height, siphon valve 234 draws the wash fluid out of mixing chamber 221 of mixing bowl 220 to outlet 232 of mixing bowl 220. Siphon valve 234 includes a post 270 mounted to or integrally formed with mixing bowl 220 at outlet 232 of mixing bowl 220 and a cap 272 positioned over post 270.

Overflow conduit 236 is also mounted to or integrally formed with mixing bowl 220. Overflow conduit 236 has an inlet 238 positioned at top portion 226 of mixing bowl 220 and an outlet 242, e.g., positioned at bottom portion 228 of mixing bowl 220. A channel 240 of overflow conduit 236 extends from inlet 238 of overflow conduit 236 to outlet 242 of overflow conduit 236. Outlet 242 of overflow conduit 236 may be positioned at or adjacent outlet 232 of mixing bowl 220.

As discussed in greater detail below, fluid additive dispenser 210 may be formed as a unitary fluid additive dispenser. Thus, various components of fluid additive dispenser 210 may be formed of or with a single, continuous piece of material, such as plastic or metal. As an example, any suitable combination of mixing bowl 220, post 270 of siphon valve 234, overflow conduit 236, inlet conduit 250 and nozzles 260 may be constructed of a single continuous piece of plastic in order to form fluid additive dispenser 210.

FIG. 5 illustrates a method 500 for forming a unitary fluid additive dispenser according to an exemplary embodiment of the present subject matter. Method 500 may be used to form any suitable fluid additive dispenser. For example, method 500 may be used to form fluid additive dispenser 210 (FIG. 3). Method 500 permits formation of various features of fluid additive dispenser 210, as discussed in greater detail below. Method 500 includes fabricating fluid additive dispenser 210 as a unitary fluid additive dispenser, e.g., such that fluid additive dispenser 210 is formed of a single continuous piece of plastic, metal or other suitable material. More particularly, method 500 includes manufacturing or forming fluid additive dispenser 210 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 510, three-dimensional information of fluid additive dispenser 210 is determined. As an example, a model or prototype of fluid additive dispenser 210 may be scanned to determine the three-dimensional information of fluid additive dispenser 210 at step 510. As another example, a model of fluid additive dispenser 210 may be constructed using a suitable CAD program to determine the three-dimensional information of fluid additive dispenser 210 at step 510. At step 520, the three-dimensional information is converted into a plurality of slices that each defines a cross-sectional layer of fluid additive dispenser 210. As an example, the three-dimensional information from step 510 may be divided into equal sections or segments, e.g., along a central axis of fluid additive dispenser 210 or any other suitable axis. Thus, the three-dimensional information from step 510 may be discretized at step 520, e.g., in order to provide planar cross-sectional layers of fluid additive dispenser 510.

After step 520, fluid additive dispenser 210 is fabricated using the additive process, or more specifically each layer is successively formed at step 530, e.g., by fusing or polymerizing a plastic using laser energy or heat. The layers may have any suitable size. For example, each layer may have a size between about five ten-thousandths of an inch and about one thousandths of an inch. Fluid additive dispenser 210 may be fabricated using any suitable additive manufacturing machine as step 530. For example, any suitable laser sintering machine, inkjet printer or laserjet printer may be used at step 530.

Utilizing method 500, fluid additive dispenser 210 may have fewer components and/or joints than known fluid additive dispensers. Specifically, fluid additive dispenser 210 may require fewer components because fluid additive dispenser 210 may be a single piece of continuous plastic or metal, e.g., rather than multiple pieces of plastic or metal joined or connected together. Also, method 500 may form fluid additive dispenser 210 such that inlet conduit 250 and nozzles 260 are integrally formed with mixing bowl 220 and such that nozzles 260 form the swirl flow pattern with the flow of fluid F from each nozzle of nozzles 260 within mixing chamber 221 of mixing bowl 220. As a result, fluid additive dispenser 210 may provide improved rinsing of mixing chamber 221 of mixing bowl 220. Also, fluid additive dispenser 210 may be less prone to leaks and/or be stronger when formed with method 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
    a cabinet having a top panel that defines a hole;
    a tub positioned within the cabinet;
    a basket disposed within the tub, the basket rotatable about an axis within the tub; and
    a unitary fluid additive dispenser positioned within the cabinet below the top panel of the cabinet, the unitary fluid additive dispenser comprising
        a mixing bowl defining a mixing chamber, the mixing bowl extending between a top portion and a bottom portion along a vertical direction, an inlet of the mixing bowl positioned directly below the hole of the top panel, a bottom wall of the mixing bowl having a sloped surface that extends between the top and bottom portions of the mixing bowl;
        an inlet conduit positioned on the mixing bowl; and
        a plurality of nozzles positioned on the mixing bowl, each nozzle of the plurality of nozzles being in fluid communication with the inlet conduit, each nozzle of the plurality of nozzles positioned and oriented for directing a flow of fluid from the inlet conduit into the mixing chamber of the mixing bowl,
        wherein the inlet conduit is positioned on the mixing bowl at the top portion of the mixing bowl, the nozzles of the plurality of nozzles are positioned with the mixing chamber of the mixing bowl at the top portion of the mixing bowl, and each nozzle of the plurality of nozzles is oriented along a common flow direction that is perpendicular to the vertical direction and parallel to an adjacent portion of the sloped surface in order to form a swirl flow pattern with the flow of fluid from each nozzle of the plurality of nozzles within the mixing chamber of the mixing bowl.

2. The washing machine appliance of claim 1, wherein the mixing bowl defines an outlet at the bottom portion of the mixing bowl.

3. The washing machine appliance of claim 1, wherein the inlet conduit extends about the mixing bowl at the top portion of the mixing bowl.

4. The washing machine appliance of claim 3, wherein the mixing bowl defines a top edge at the top portion of the mixing bowl, the inlet conduit and the plurality of nozzles positioned at the top edge of the mixing bowl.

5. The washing machine appliance of claim 4, wherein the nozzles of the plurality of nozzles are uniformly distributed on the top edge of the mixing bowl.

6. The washing machine appliance of claim 1, further comprising an overflow conduit positioned on the mixing bowl, the overflow conduit having an inlet positioned at the top portion of the mixing bowl.

7. The washing machine appliance of claim 1, wherein the mixing bowl defines an outlet at the bottom portion of the mixing bowl, the overflow conduit having a channel that extends from the inlet of the overflow conduit towards the outlet of the mixing bowl.

8. The washing machine appliance of claim 1, wherein the mixing bowl, the inlet conduit and the plurality of nozzles are constructed of a single continuous piece of plastic.

* * * * *